United States Patent
Ito

(10) Patent No.: US 7,719,629 B2
(45) Date of Patent: May 18, 2010

(54) LIQUID CRYSTAL DISPLAY DEVICE, LIQUID CRYSTAL MODULE AND FRONT PANEL OF LIQUID CRYSTAL DISPLAY DEVICE

(75) Inventor: Atsushi Ito, Kanagawa (JP)

(73) Assignee: Sony Corporation (JP)

( * ) Notice: Subject to any disclaimer, the term of this patent is extended or adjusted under 35 U.S.C. 154(b) by 148 days.

(21) Appl. No.: 11/906,768

(22) Filed: Oct. 3, 2007

(65) Prior Publication Data

US 2008/0129920 A1 Jun. 5, 2008

(30) Foreign Application Priority Data

Oct. 4, 2006 (JP) .......................... P2006-273070

(51) Int. Cl.
G02F 1/1333 (2006.01)

(52) U.S. Cl. ....................................................... 349/58

(58) Field of Classification Search ................ None
See application file for complete search history.

(56) References Cited

U.S. PATENT DOCUMENTS

| | | | | |
|---|---|---|---|---|
| 5,675,396 A | * | 10/1997 | Tsunehiro | 349/59 |
| 5,808,707 A | * | 9/1998 | Niibori et al. | 349/60 |
| 6,064,453 A | * | 5/2000 | Inubushi et al. | 349/58 |
| 6,559,907 B1 | * | 5/2003 | Byoun | 349/58 |
| 6,870,582 B2 | | 3/2005 | Hayashimoto et al. | |
| 7,423,865 B2 | * | 9/2008 | Oooka et al. | 361/679.27 |
| 2005/0088839 A1 | * | 4/2005 | Huang et al. | 362/31 |
| 2006/0209226 A1 | * | 9/2006 | Chung | 349/58 |

FOREIGN PATENT DOCUMENTS

| | | |
|---|---|---|
| JP | 2001-305985 A | 11/2001 |
| JP | 2003-195263 A | 7/2003 |

* cited by examiner

*Primary Examiner*—Mike Stahl
(74) *Attorney, Agent, or Firm*—Lerner, David, Littenberg, Krumholz & Mentlik, LLP

(57) ABSTRACT

A liquid crystal display device is disclosed. The liquid crystal display device may include a cabinet having a front panel facing the front and in which an opening is formed; a liquid crystal panel having a display surface; and a chassis configured to clamp the outer region of the liquid crystal panel from the front side and the back side, to face the display surface to the opening, and to arrange the liquid crystal panel inside the cabinet. A hook may be provided that is projected rearward from a position close to the opening on the back surface of the front panel and engaged with the chassis that clamps the outer region of the liquid crystal panel, and prevents a displacement of the chassis toward the rear side.

16 Claims, 7 Drawing Sheets

LIQUID CRYSTAL DISPLAY DEVICE, LIQUID CRYSTAL MODULE AND FRONT PANEL OF LIQUID CRYSTAL DISPLAY DEVICE

CROSS-REFERENCE TO RELATED APPLICATIONS

This application claims priority from Japanese Patent Application No. JP 2006-273070 filed in the Japanese Patent Office on Oct. 4, 2006, the entire content of which is incorporated herein by reference.

BACKGROUND OF THE INVENTION

1. Field of the Invention

The present invention relates to a liquid crystal display device, a liquid crystal module and a front panel of a liquid crystal display device.

2. Description of the Related Art

Television sets using a liquid crystal display device and a display device for personal computers are offered.

Such liquid crystal display devices have a cabinet and a liquid crystal module assembled inside the cabinet. The liquid crystal module has a liquid crystal panel, a back light unit that is arranged on the rear side of the liquid crystal panel, and a chassis that holds the liquid crystal panel and the back light unit.

In many cases, the cabinet has a front panel facing the front and having a rectangular opening thereinside, and the liquid crystal panel is arranged so that its display surface is faced to the opening.

In such a liquid crystal display device, when the liquid crystal panel receives an external force in the thickness direction, the colors and edges of an image displayed are disturbed. Thus, it is necessary to secure a predetermined space between the edge part of the front panel configuring the opening and the display surface of the liquid crystal panel so that an external force is not affected in the thickness direction of the liquid crystal panel.

On the other hand, when a larger space is formed between the edge part of the front panel configuring the opening and the display surface of the liquid crystal panel, the structures inside the cabinet are seen by a user, which disfigures the appearance of the device. Therefore, it is necessary to regulate the space so as not to widen over predetermined dimensions.

In the techniques before, such a structure is proposed that a hook disposed on a front panel is engaged with the outer frame part of a chassis that holds a back light unit, whereby the front panel is mounted on the back light unit (see JP-A-2003-195263 (Patent Reference 1)).

SUMMARY OF THE INVENTION

However, in the structure before, since the hook is engaged with the outer frame part of the chassis that hold the back light unit, it is inevitable to increase the distance between the position at which the displacement toward the rear side is regulated by the hook and the edge part of the liquid crystal panel. On this account, it is difficult to effectively regulate the displacement of the liquid crystal panel toward the rear side by the hook. Thus, the space tends to widen, particularly, an upsized liquid crystal panel further increases the distance between the hook and the edge part of the opening, which causes the space to tend to widen. There is concern that the appearance is disfigured.

Thus, it may be desirable to provide a liquid crystal display device, a liquid crystal module and a front panel of a liquid crystal display device, which are advantageous to reliably regulate a space formed between the display surface of the liquid crystal panel and the edge part of the front panel configuring the opening.

A liquid crystal display device according to an embodiment of the invention is a liquid crystal display device which may include a cabinet having a front panel facing the front and having an opening formed inside thereof; a liquid crystal panel having a display surface; and a chassis configured to clamp the outer region of the liquid crystal panel from the front side and the back side, to face the display surface to the opening, and to arrange the liquid crystal panel inside the cabinet, wherein a hook is provided that is projected rearward from a position close to the opening on the back surface of the front panel and engaged with the chassis that clamps the outer region of the liquid crystal panel, and prevents a displacement of the chassis toward the rear side.

A liquid crystal display device according to an embodiment of the invention is a liquid crystal display device which may include a cabinet having a front panel facing the front and having an opening formed inside thereof; a liquid crystal panel having a display surface; and a chassis configured to clamp the outer region of the liquid crystal panel from the front side and the back side, to face the display surface to the opening, and to arrange the liquid crystal panel inside the cabinet, wherein a hook is provided that is projected rearward from a position close to the opening on the back surface of the front panel and engaged with the back surface of the liquid crystal panel, and prevents a displacement of the chassis toward the rear side.

A liquid crystal module according to an embodiment of the invention is a liquid crystal module which may include a liquid crystal panel; a back light unit arranged on the rear side of the liquid crystal panel; and a chassis configured to hold the liquid crystal panel and the back light unit, wherein the liquid crystal panel is held by clamping the outer region of the liquid crystal panel by means of the chassis, and a notch is formed on the chassis at a position close to the liquid crystal panel, the notch is engaged with a hook from the rear side and prevents a displacement of the chassis toward the rear side.

A liquid crystal module according to an embodiment of the invention is a liquid crystal module which may include a liquid crystal panel; a back light unit arranged on the rear side of the liquid crystal panel; and a chassis configured to hold the liquid crystal panel and the back light unit, wherein the chassis has a front clamping piece facing the outer region of the display surface of the liquid crystal panel and a back clamping piece facing the outer region of the back surface of the liquid crystal panel, the liquid crystal panel is held by clamping the outer region of the liquid crystal panel between the front clamping piece and the back clamping piece, the front clamping piece has a front surface facing a front panel and a back surface facing a display surface of the liquid crystal panel, and a notch is formed on the front clamping piece at a position close to the liquid crystal panel, the notch is engaged with a hook from the back surface of the front clamping piece and prevents a displacement of the position toward rear side.

A liquid crystal module according to an embodiment of the invention is a liquid crystal module which may include a liquid crystal panel; a back light unit arranged on the rear side of the liquid crystal panel; and a chassis configured to hold the liquid crystal panel and the back light unit, wherein the liquid crystal panel is held by clamping the outer region of the liquid crystal panel by means of the chassis, and a notch is formed on the chassis at a position close to the liquid crystal panel, the notch is engaged with a hook with the back surface of the liquid crystal panel from the rear side and prevents a displacement of the liquid crystal panel toward the rear side.

A liquid crystal module according to an embodiment of the invention is a liquid crystal module which may include a liquid crystal panel; a back light unit arranged on the rear side of the liquid crystal panel; and a chassis configured to hold the liquid crystal panel and the back light unit, wherein the chassis has a front clamping piece facing the outer region of the display surface of the liquid crystal panel and a back clamping piece facing the outer region of the back surface of the liquid crystal panel, the liquid crystal panel is held by clamping the outer region of the liquid crystal panel between the front clamping piece and the back clamping piece, and a notch is formed on the front clamping piece and the back clamping piece at positions close to the liquid crystal panel, the notch allows a hook to be engaged with the back surface of the liquid crystal panel from the rear side and prevents a displacement of the liquid crystal panel toward the rear side.

A front panel according to an embodiment of the invention is a front panel of a liquid crystal display device having an opening facing the front and in which a display surface of a liquid crystal panel is faced to the inner side, which may include a hook projected rearward on the back surface of the front panel from a position close to the opening, the hook being engaged with a chassis clamping the liquid crystal panel.

A front panel according to an embodiment of the invention is a front panel of a liquid crystal display device having an opening facing the front and in which a display surface of a liquid crystal panel is faced to the inner side, which may include a hook projected rearward on the back surface of the front panel from a position close to the opening, the hook being engaged with the back surface of the liquid crystal panel.

According to an embodiment of the invention, the displacement of the liquid crystal panel toward the rear side can be effectively prevented. Accordingly, the space formed between the display surface of the liquid crystal panel and the edge part of the opening of the front panel can be reliably regulated, which is advantageous to intend an improved appearance.

DETAILED DESCRIPTION

First Embodiment

Next, a first embodiment according to an embodiment of the invention will be described with reference to the drawings.

First, a television set 10 using a liquid crystal display device 20 according to the first embodiment will be described.

Figure 1:
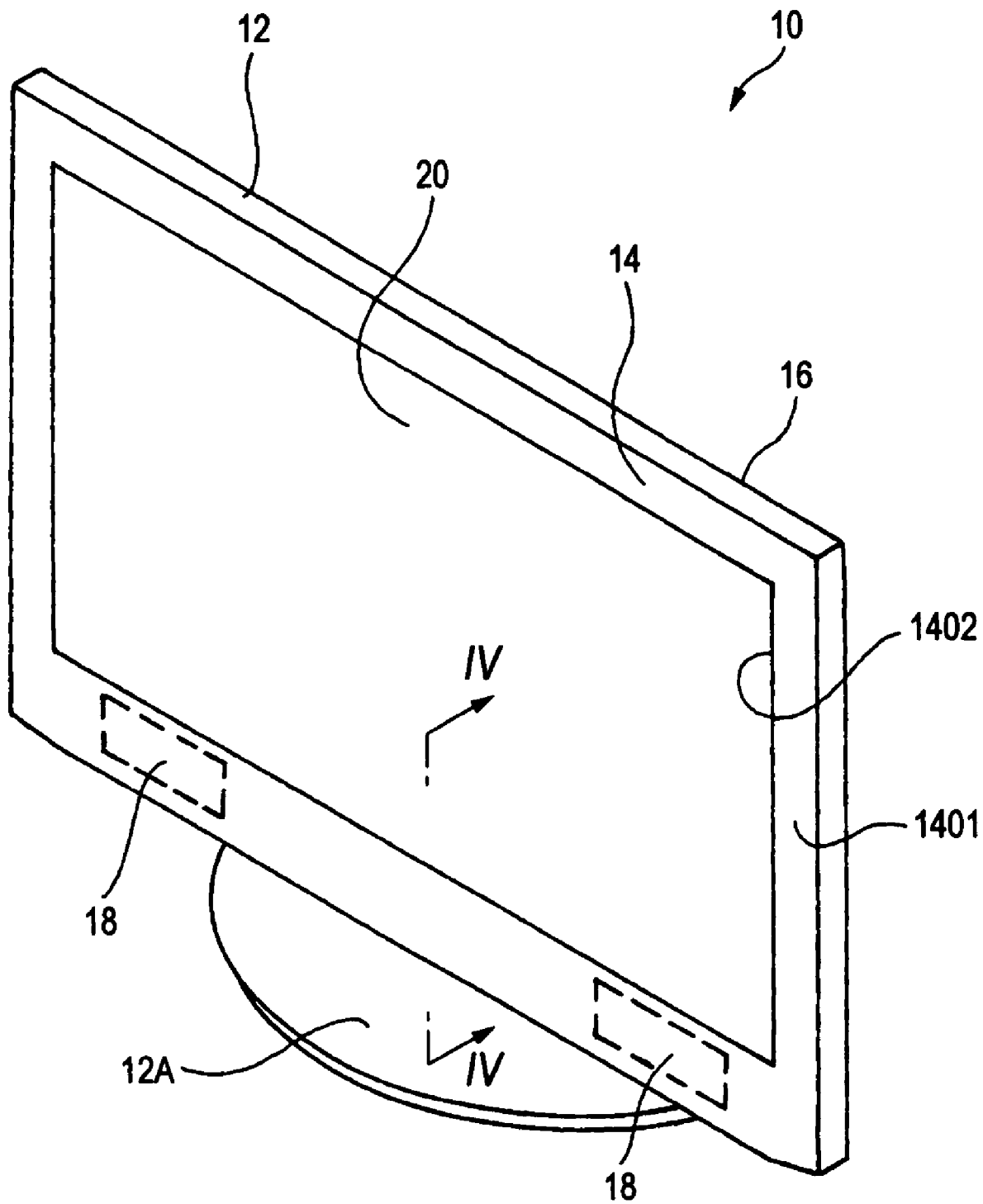
FIG. 1 shows a perspective view depicting a television set 10 having a liquid crystal display device 20 according to a first embodiment.
Figure 2:
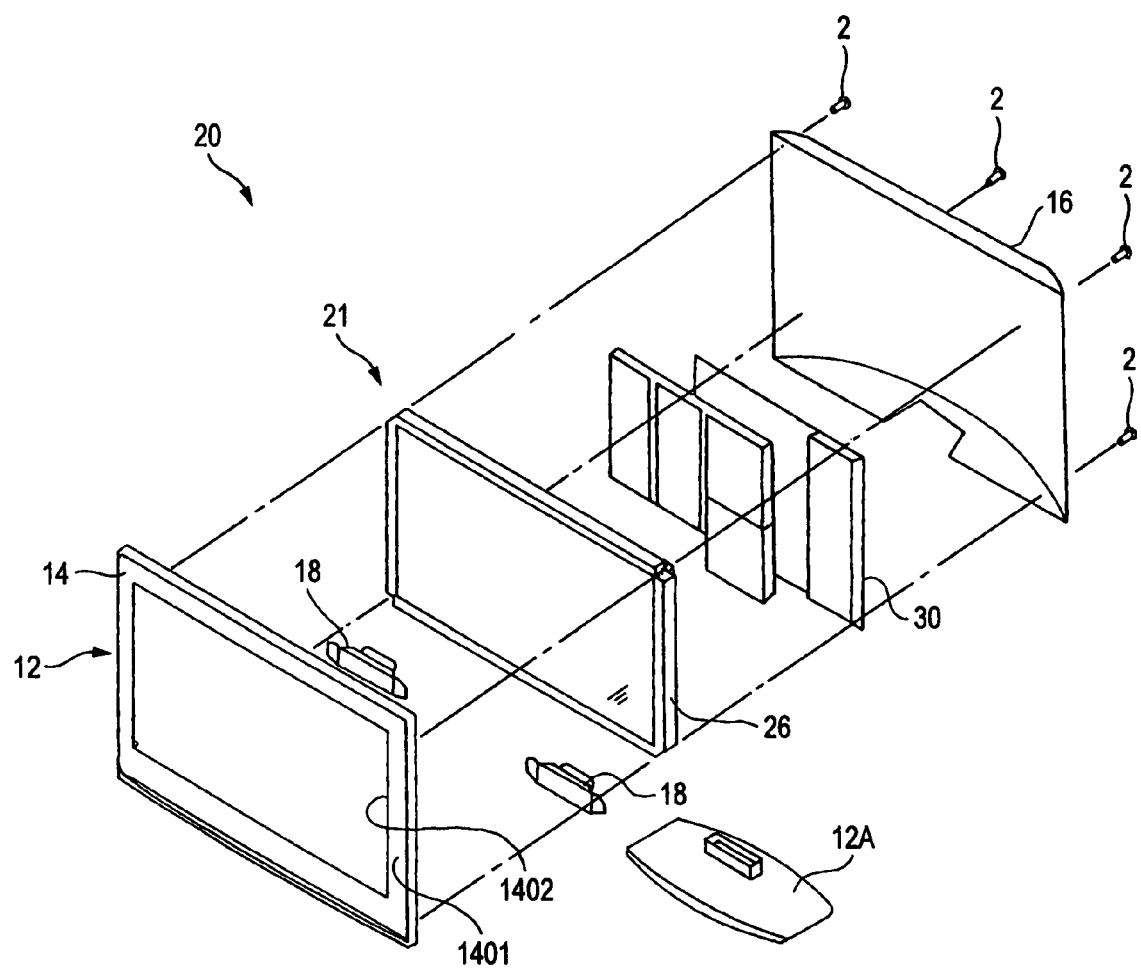
FIG. 2 shows an exploded perspective view depicting the television set 10 having the liquid crystal display device 20 according to the first embodiment.

FIG. 1 shows a perspective view depicting the television set 10 using the liquid crystal display device 20 according to the first embodiment, and FIG. 2 shows an exploded perspective view depicting the same.

As shown in FIG. 1, the television set 10 has a cabinet 12 that configures an exterior component, and a stand 12A that is provided under the cabinet 12 and placed on the surface mounting thereon.

The cabinet 12 has a front cabinet 14 and a back cabinet 16 in a rectangular plate shape. In the drawing, numeral 18 denotes right and left speakers. The cabinet 12 is a cabinet for the television set 10 and for the liquid crystal display device 20 as well.

The front cabinet 14 has a front panel 1401 facing the front, and the front panel 1401 has a rectangular opening 1402 formed therein.

The liquid crystal display device 20 is configured to include a liquid crystal module 21. As shown in FIG. 2, the liquid crystal module 21 is assembled in the cabinet 12. In addition, the liquid crystal display device 20 is configured of the liquid crystal module 21 and the cabinet 12.

Figure 3:
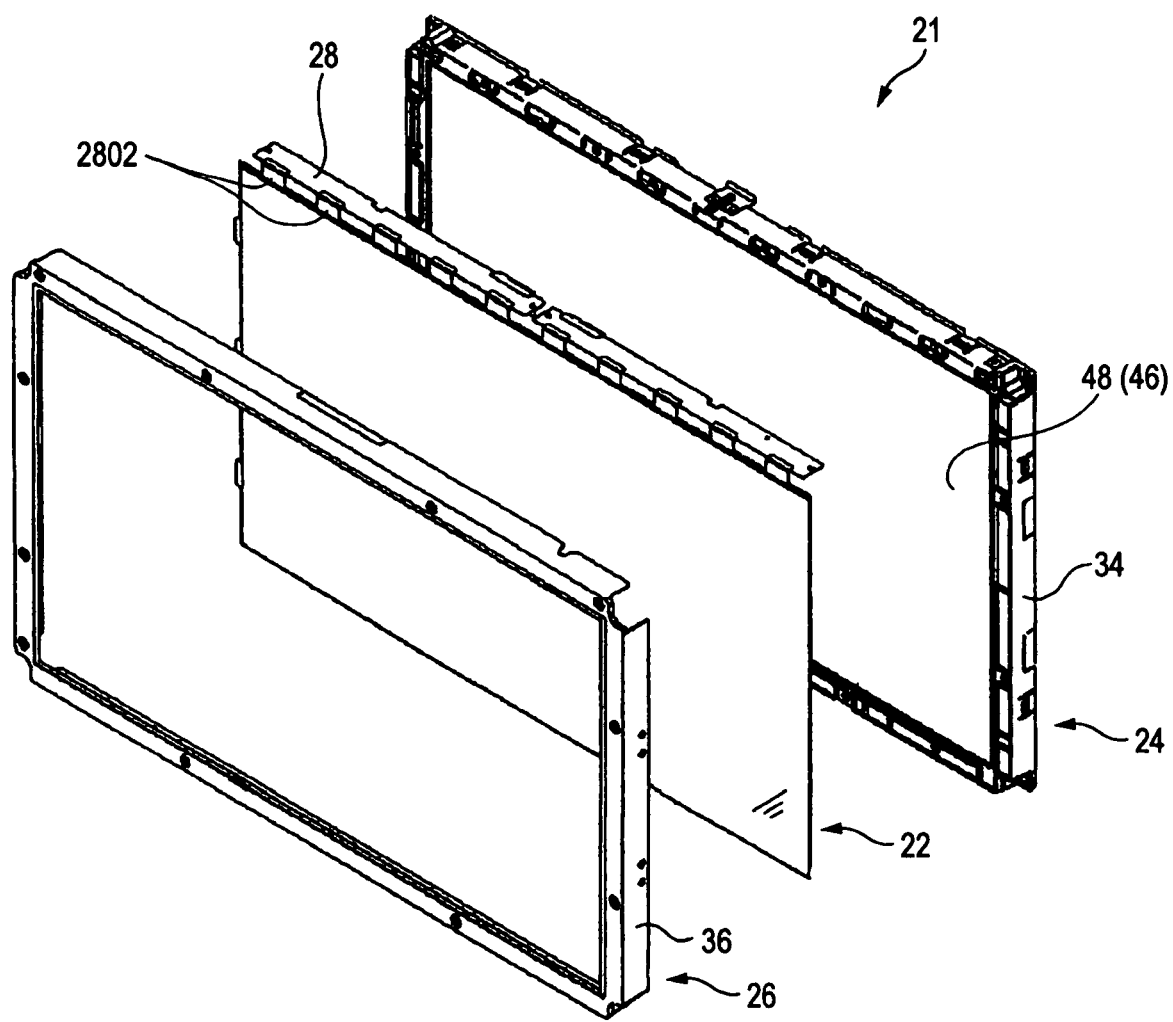
FIG. 3 shows an exploded perspective view depicting a liquid crystal module 21.
Figure 4:
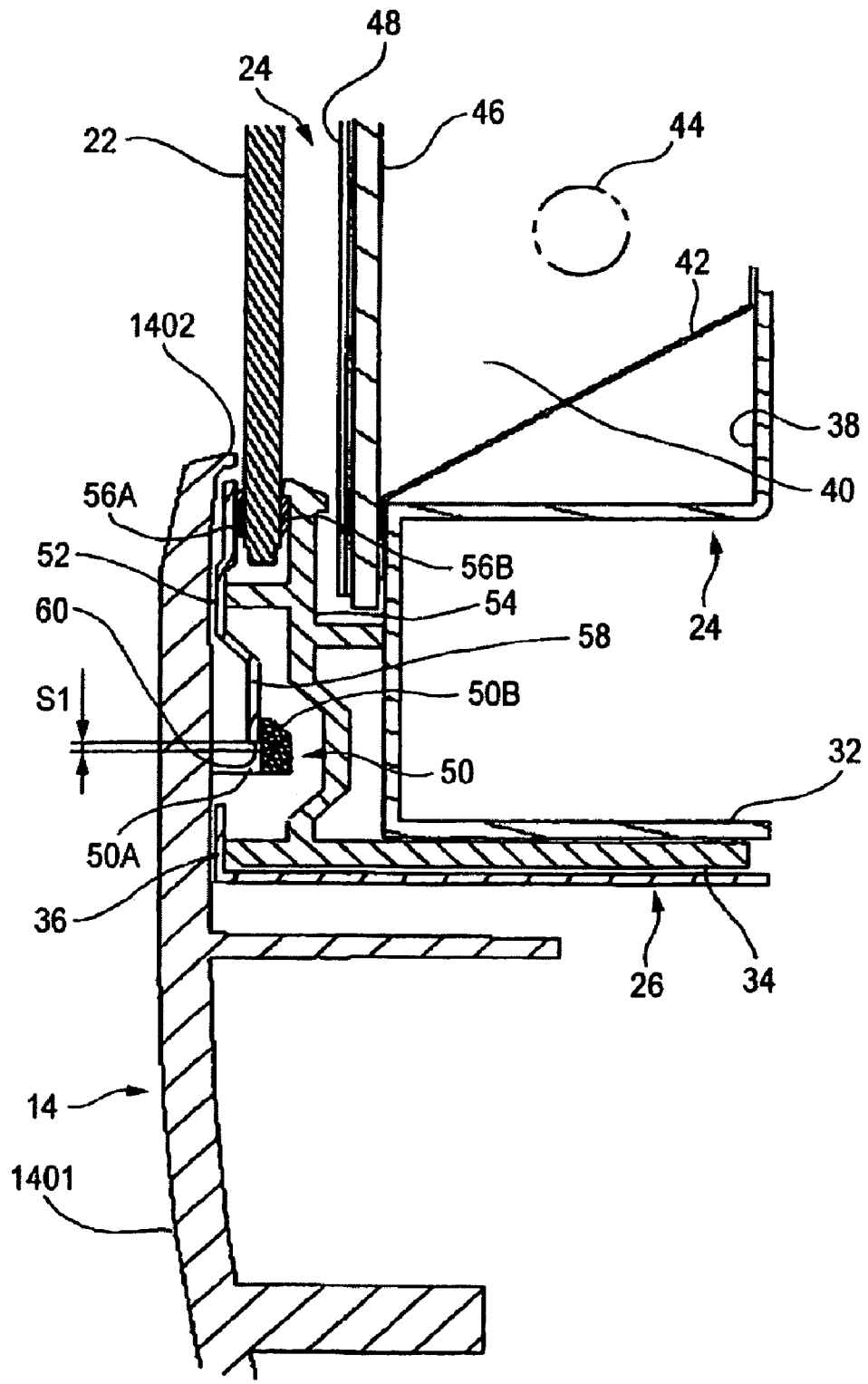
FIG. 4 shows a cross section at line AA shown in FIG. 1.

FIG. 3 shows an exploded perspective view depicting the liquid crystal module 21, and FIG. 4 shows a cross section at line AA shown in FIG. 1.

As shown in FIG. 3, the liquid crystal module 21 is configured to include a liquid crystal panel 22, a back light unit 24, and a chassis 26 that holds them. As shown in FIG. 4, the chassis 26 is configured to include a bottom chassis 32, a middle chassis 34, and a top chassis 36.

In FIG. 3, numeral 28 denotes a drive substrate configuring a drive circuit that drives the liquid crystal panel 22, and the drive substrate 28 is connected to the upper edge of the liquid crystal panel 22 through a flexible substrate 2802.

In addition, in FIG. 2, numeral 30 denotes a board part configuring various electronic circuits such as a power source circuit that supplies power to individual components and a tuner circuit that receives television signals to reproduce video signals and audio signals. The board part 30 is mounted on the bottom chassis 32 positioned on the rear part of the liquid crystal module 21 through screws.

In addition, the drive substrate 28 and the board part 30 configure a part of the liquid crystal module 21.

The liquid crystal module 21 is held on the cabinet 12. In detail, the liquid crystal module 21 is disposed inside the cabinet 12 by holding the chassis 26 on the cabinet 12.

In the embodiment, as shown in FIG. 2, screw through holes are provided at four corners of the chassis 26 (the top chassis 36) and four corners of the back cabinet 16, internal threads are provided at four corners of the front cabinet 14, and screws 2 are fastened to the internal threads of the front cabinet 14 through the screw through holes of the back cabinet 16 and the screw through holes of the top chassis 36, whereby the liquid crystal module 21 is held on the cabinet 12. In addition, various known configurations can be adopted to the structure of arranging the liquid crystal module 21 on the cabinet 12.

As shown in FIG. 3, the liquid crystal panel 22 has a rectangular plate shape.

The liquid crystal panel 22 is configured to include two transparent glass base materials, a liquid crystal layer sandwiched between the glass base materials, a transparent electrode, a color filter and polarizers arranged on the inner surface of the glass base materials.

More specifically, the liquid crystal panel 22 is configured in which two transparent substrates made, such as, of glass are arranged to face to each other and a liquid crystal layer having liquid crystals sealed therein is provided between the substrates.

On one of the substrates, signal lines and scanning lines arranged in a matrix, a switching device (thin film transistor) and a pixel electrode disposed at the intersection point of the signal line and the scanning line are formed. The switching device is in turn selected by the scanning line, and writes a video signal supplied through the signal line to the corresponding pixel electrode.

On the other of the substrates, a counter electrode and a color filter are formed.

The color filter is split into a plurality of segments each corresponding to a pixel, and for example, it is split into three segments, a red filter, a green filter, and a blue filter.

Furthermore, these two substrates are sandwiched between two polarizers.

In addition, various known configuration in the past can be adopted to the structure of the liquid crystal panel 22 itself.

The back light unit 24 applies luminous lights onto the back surface of the liquid crystal panel 22. In the state in which luminous lights are applied, a drive signal for displaying an image is supplied to the scanning line, the signal line, and the counter electrode to drive the liquid crystals in the liquid crystal layer, whereby an image is displayed on the display surface of the liquid crystal panel 22.

As shown in FIG. 4, the back light unit 24 is configured to include a recessed part 38 that is formed on the bottom chassis 32 and opened frontward, a reflective sheet 42 that is disposed inside the recessed part 38 and partitions an illumination space 40 that is opened frontward, a fluorescent tube 44 that is disposed in the illumination space 40, and a diffuser 46 and an optical sheet 48 that block the front of the illumination space 40.

The fluorescent tube 44 is configured of a cold-cathode tube (fluorescent lamp) which is supplied with current and emits white lights.

More specifically, the fluorescent tube 44 has an electrode on both sides thereof, a predetermined fluorescent material coated on the inner wall, and an inert gas such as Hg (mercury) or Xe (xenon) sealed therein. In the fluorescent tube 44, current is carried through the electrodes, thermoelectrons are emitted from a filament to start discharge, and the thermoelectrons collide against Hg atoms inside the tube and are pumped to emit ultraviolet rays. Hg atoms emit ultraviolet rays, and then come into the ground state. The ultraviolet rays are absorbed by the fluorescent material coated on the tube wall, and then emit while lights to outside.

The reflective sheet 42 is formed of a material having a high reflectance, which reflects the lights applied from the fluorescent tube 44 in the diffuser 46 and guides the lights. Various known products and materials commercially available can be adopted to the reflective sheet 42.

The diffuser 46 diffuses the light applied from the fluorescent tube 44 and the lights reflected in the diffuser 46 by the reflector 32, and the diffuser 46 illuminates the liquid crystal panel 22 from the rear side. The diffuser 46 is formed of a translucent material.

Various known materials can be adopted to a translucent material forming the diffuser 46, such as a polystyrene resin or an MS resin (styrene-methyl methacrylate resin).

The optical sheet 48 guides the lights from the diffuser 46 to the liquid crystal panel 22, and the optical sheet 48 is arranged on the surface on which the diffuser 46 faces the liquid crystal panel 22. Various known products and materials commercially available can be adopted to the optical sheet 48.

In addition, various known configurations in the past can be adopted to the structure of arranging the diffuser 46 and the optical sheet 48; for example, the diffuser 46 and the optical sheet 48 are pressed against the bottom chassis 32 by a retaining piece projected from the middle chassis 34.

Next, the structure of arranging the liquid crystal panel 22 will be described.

Figure 5:
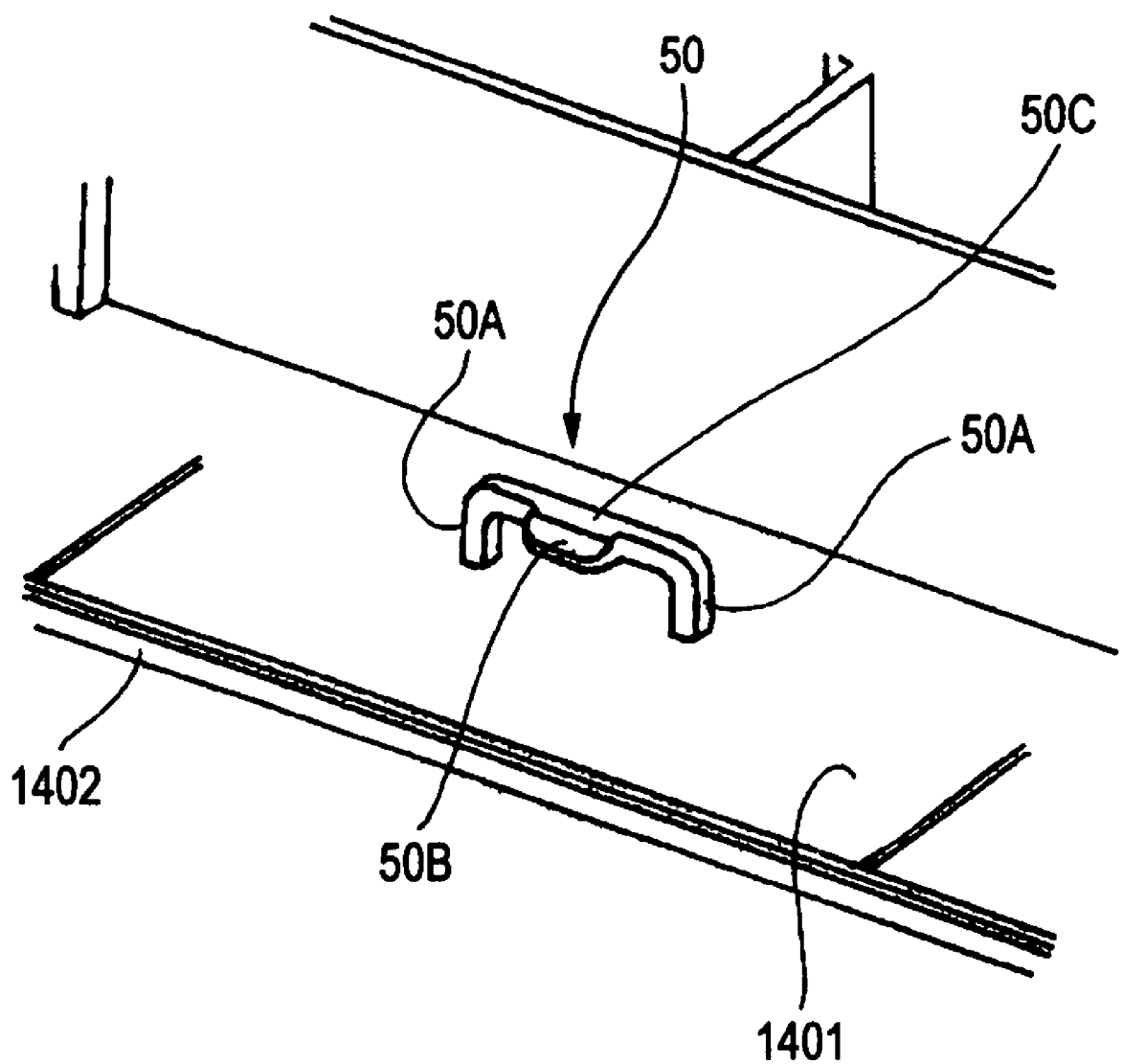
FIG. 5 shows a perspective view depicting a hook 50 formed on the back surface of a front panel 1401.
Figure 6:
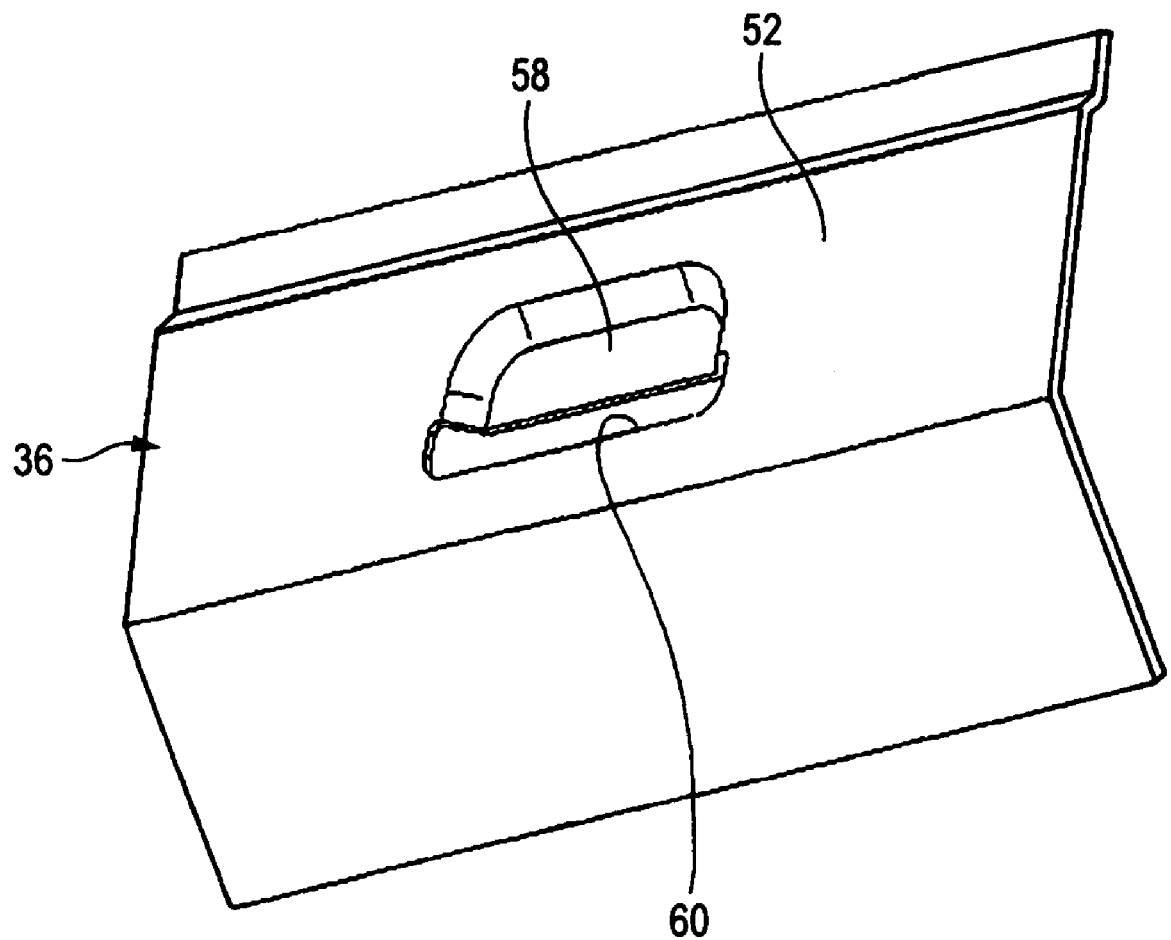
FIG. 6 shows a perspective view depicting a notch 58 formed on a top chassis 36.

FIG. 5 shows a perspective view depicting a hook 50 formed on the back surface of the front panel 1401, and FIG. 6 shows a perspective view depicting a notch 58 formed on the top chassis 36.

The liquid crystal panel 22 is arranged in the cabinet 12 in which the chassis 26 clamps the outer region of the liquid crystal panel 22 between the front side and the rear side in the state in which the display surface faces the opening 1402.

The hook 50 is projected rearward from the position close to the opening 1402 on the back surface of the front panel 1401, and the hook 50 engages with the chassis 26 that clamps the outer region of the liquid crystal panel 22 to prevent the displacement of the chassis 26 toward the rear side.

In detail, as shown in FIG. 4, the top chassis 36 is provided with a front clamping piece 52 that faces the outer region of the display surface of the liquid crystal panel 22 from the front side along the outer region of the liquid crystal panel 22.

In addition, the middle chassis 34 is provided with a back clamping piece 54 that faces the outer region of the back surface of the liquid crystal panel 22 from the rear side along the outer region of the liquid crystal panel 22.

The outer region of the liquid crystal panel 22 is clamped between the front clamping piece 52 and the back clamping piece 54.

In the embodiment, the outer region of the liquid crystal panel 22 is clamped between the front clamping piece 52 and the back clamping piece 54 in the state in which an elastic body 56A is put between the front clamping piece 52 and the outer region of the display surface of the liquid crystal panel 22 as well as an elastic body 56B is put between the back clamping piece 54 and the outer region of the back surface of the liquid crystal panel 22.

In the embodiment, a recessed part 58 is disposed on the front clamping piece 52 at the position close to the liquid crystal panel 22, the clamping piece 52 that is recessed rearward by drawing.

A notch 60 is formed on the bottom part of the recessed part 58.

The hook 50 is engaged with the edge of the notch 60 of the front clamping piece 52 at the position close to the liquid crystal panel 22, the edge defining the outer region of the notch 60.

As shown in FIGS. 4 and 5, the hook 50 has a leg part 50A that is projected rearward from the back surface of the front panel 1401, and a claw 50B that is projected from the rear end of the leg part 50A toward the direction intersecting with the projecting direction of the leg part 50A.

The hook 50 is formed in one piece with the front panel 1401, the front panel 1401 is formed of a synthetic resin, and the leg part 50A is formed elastically deformable in the direction intersecting with its projecting direction. In addition, for the synthetic resin material forming the front panel 1401, for example, various known materials such as an ABS resin and a polystyrene resin can be adopted.

The hook 50 is disposed at four positions corresponding to four sides of the liquid crystal panel 22. In the embodiment, a plurality of the hooks 50 (two hooks) is formed and spaced at four positions corresponding to four sides of the liquid crystal panel 22 in the direction of extending on each side.

In the embodiment, the leg part 50A is projected at two positions spaced in the direction of extending on the sides of the rectangular opening 1402, and the claw 50B is projected from a connecting part 50C that connects the leg parts 50A to each other.

As shown in FIG. 4, the front clamping piece 52 has a front surface facing the front panel and a back surface facing the display surface of the liquid crystal panel 22, and the claw 50B of the hook 50 is engaged with the edge of the notch 60 on the back surface of the front clamping piece 52 at the position close to the liquid crystal panel 22, the edge defining the outer region of the notch 60.

In addition, a space S1 is provided between the edge defining the outer region of the notch 60 and the leg part 50A.

In addition, the front panel 1401 and the middle chassis 34 are formed of a synthetic resin, and the bottom chassis 32 and the top chassis 36 are formed of a metal.

According to the embodiment, the hook 50 disposed on the back surface of the front panel 1401 is engaged with the portion of the chassis 26 that clamps the outer region of the liquid crystal panel 22, and prevents the displacement of the chassis 26 toward the rear side.

At this time, since the hook 50 is projected rearward from the position close to the opening 1402 on the back surface of the front panel 1401, the hook 50 can be brought close to the portion of the chassis 26 close to the liquid crystal panel 22, that is, the hook 50 can be brought close to the edge part of the liquid crystal panel 22. Thus, the displacement of the liquid crystal panel 22 toward the rear side can be effectively prevented.

Therefore, the space formed between the display surface of the liquid crystal panel 22 and the edge part of the opening 1402 of the front panel 1401 can be reliably regulated, which is advantageous to intend an improved appearance. Particularly, even though the liquid crystal panel is upsized and the space tends to widen, the space can be reliably regulated, which is advantageous to intend an improved appearance.

In addition, the embodiment also exerts the following advantage.

The front panel 1401 is formed of a synthetic resin material, and the top chassis 36 is formed of a metal material. Therefore, suppose that the thermal expansion coefficient of the front panel 1401 has a value greater than the thermal expansion coefficient of the top chassis 36 and the leg part 50A of the hook 50 is almost abutted against the edge defining the outer region of the notch 60 of the top chassis 36 with almost no space S1 in the assembly of the device.

In this case, when the ambient temperature around the television set 10 greatly drops from the ambient temperature in the assembly of the device, the front panel 1401 is greatly contracted to press the leg part 50A of the hook 50 against the edge defining the outer region of the notch 60 of the top chassis 36, and a large load is applied to the leg part 50A, which is disadvantageous to intend an improved durability of the hook 50.

In contrast to this, the provision of the space S1 as in the embodiment causes a small load even though the ambient temperature is changed to press the leg part 50A of the hook 50 against the edge defining the outer region of the notch 60, which is advantageous to intend an improved durability of the hook 50.

In addition, in the embodiment, since the leg part 50A is elastically deformable, the leg part 50A is elastically deformed to sufficiently absorb the load, which is more advantageous to intend an improved durability of the hook 50.

In addition, also in the case in which vibrations or an impact is applied to the cabinet 12, the leg part 50A of the hook 50 is pressed against the edge defining the outer region of the notch 60 of the top chassis 36 to apply a load to the leg part 50A. According to the embodiment, effects as similar to the discussion above can of course reduce the load applied to the leg part 50A.

In addition, in the embodiment, the hook 50 is engaged with the front clamping piece 52, the front clamping piece 52 and the back clamping piece 54 clamping the outer region of the liquid crystal panel 22. Therefore, as compared with the case in which the hook 50 is engaged with the back clamping piece 54, it is advantageous to intend a simple structure and a reduction in costs.

In addition, in the embodiment, the top chassis 36 is drawn to form the recessed part 58 that is recessed in the direction apart from the front panel 1401, the notch 60 is formed in the bottom part of the recessed part 58, and the hook 50 is engaged with the edge part of the notch 60. Thus, the length of the leg part 50A can be elongated with no increase in the thickness of the cabinet 12 in depth, and the leg part 50A can be easily elastically deformed, which is advantageous to intend an improved durability of the hook 50.

In addition, it is sufficient that the hook 50 is provided on the front panel 1401, which may be formed in one piece or formed separately. The hook 50 is provided in one piece with the front panel 1401 as in the embodiment, which is advantageous to intend a reduction in the number of parts to curtail costs.

In addition, in the embodiment, the case is described in which a plurality of the hooks 50 is arranged at four positions corresponding to four sides of the liquid crystal panel 22. However, the hooks 50 may be arranged at a single position corresponding to each side of the liquid crystal panel 22.

In addition, in the embodiment, the case is described in which the hook 50 is configured of two leg parts 50A, the connecting part 50C, and the claw 50B. However, the hook 50 may be configured of a single leg part 50A and a single claw 50B, or the hook 50 may be configured of three leg parts 50A and a single claw 50B. The hook 50 may be configured freely.

Second Embodiment

Next, a second embodiment will be described.

Figure 7:
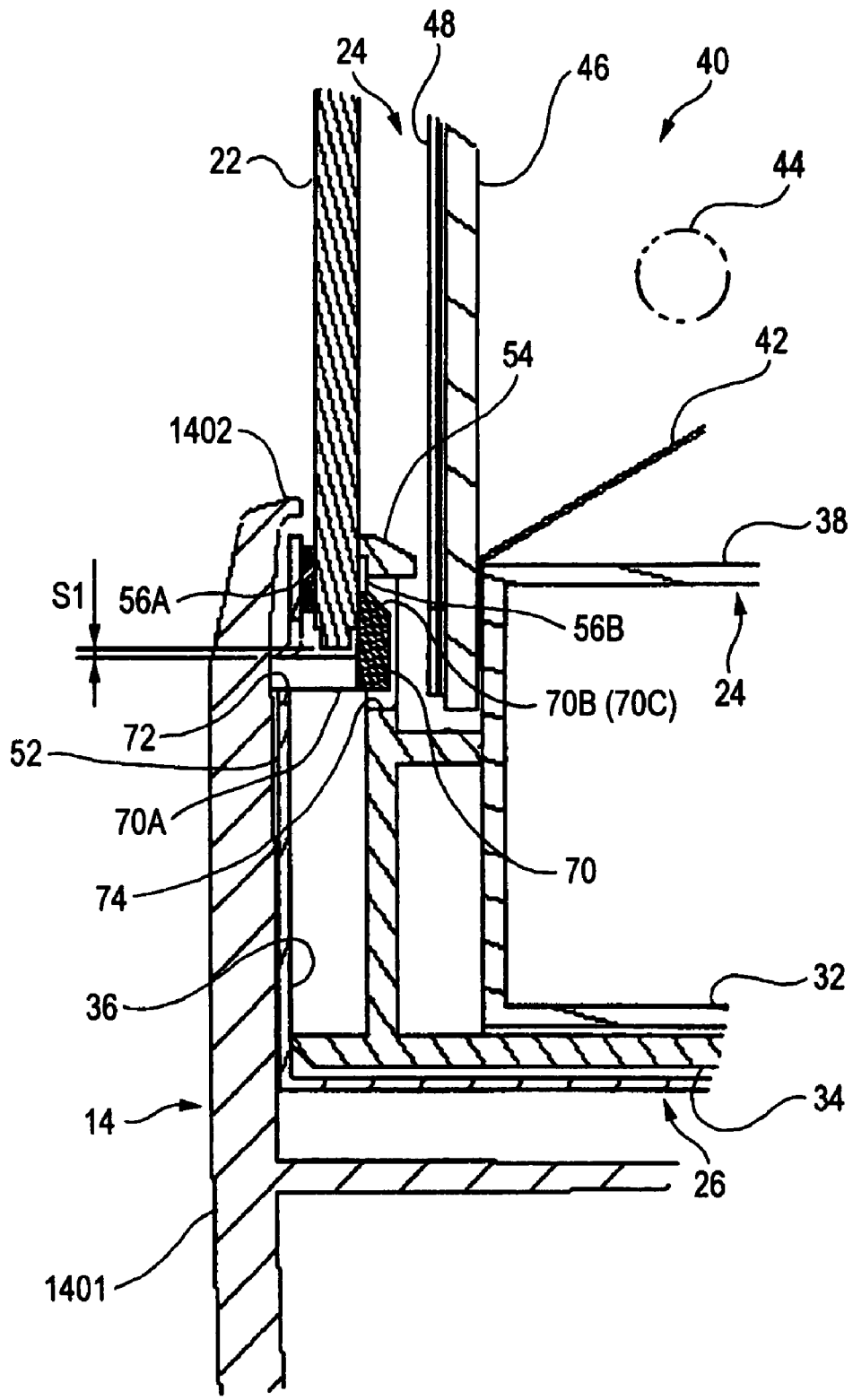
FIG. 7 shows a cross section depicting the configuration of a liquid crystal display device 20 according to a second embodiment.

FIG. 7 shows a cross section depicting the configuration of a liquid crystal display device 20 according to the second embodiment.

The second embodiment is different from the first embodiment in that instead of engaging the hook with the chassis 26, it is engaged with the back surface of the liquid crystal panel 22. Since the other configurations are the same as those in the first embodiment, the same portions as those of the first embodiment are designated the same numerals and signs in the drawing, omitting the descriptions.

A hook 70 is provided that is projected rearward from the position close to an opening 1402 on the back surface of a front panel 1401 and engaged with the back surface of a liquid crystal panel 22 to prevent the displacement of the liquid crystal panel 22 toward the rear side.

More specifically, the liquid crystal display device 20 is configured to include a back light unit 24 arranged on the rear side of the liquid crystal panel 22. As similar to the first embodiment, a chassis 26 has a bottom chassis 32 and a middle chassis 34 that hold the back light unit 24, and a top chassis 36 that is joined to these chassis.

The chassis 26 has a front clamping piece 52 that faces to the outer region of the display surface of the liquid crystal panel 22, and a back clamping piece 54 that faces the outer region of the back surface of the liquid crystal panel 22. The outer region of the liquid crystal panel 22 is clamped between the front clamping piece 52 and the back clamping piece 54. More specifically, the outer region of the liquid crystal panel 22 is clamped between the front clamping piece 52 and the back clamping piece 54 in the state in which an elastic body 56A is put between the front clamping piece 52 and the outer region of the display surface of the liquid crystal panel 22 as well as an elastic body 56B is put between the back clamping piece 54 and the outer region of the back surface of the liquid crystal panel 22.

The front clamping piece 52 is provided on the top chassis 36, and the back clamping piece 54 is provided on the middle chassis 34.

Notches 72 and 74 that the hook 70 is inserted therethrough are formed on the front clamping piece 52 and the back clamping piece 54, respectively.

The hook 70 has a leg part 70A that is projected rearward from the back surface of the front panel 1401, and a claw 70B that is projected from the rear end of the leg part 70A toward the direction intersecting with the projecting direction of the leg part 70A and engaged with the back surface of the liquid crystal panel 22.

The leg part 70A is formed of a synthetic resin, and the leg part 70A is formed elastically deformable in the direction intersecting with its projecting direction.

More specifically, as similar to the first embodiment, the leg part 70A is projected at two positions spaced in the direction extending from the sides of the rectangular opening 1402, and the claw 70B is projected from a connecting part 70C that connects the leg parts 70A to each other.

As similar to the first embodiment, a space S2 is provided reliably between the liquid crystal panel 22 and the leg part 70A.

The hook 70 is disposed at four positions corresponding to four sides of the liquid crystal panel 22. In the embodiment, a plurality of the hooks 70 (two hooks) is formed and spaced at four positions corresponding to four sides of the liquid crystal panel 22 in the direction extending from each side.

The second embodiment also exerts the same advantages as the first embodiment.

In other words, the hook 70 is projected rearward from the position close to the opening 1402 on the back surface of the front panel 1401, and the hook 70 is directly engaged with the back surface of the liquid crystal panel 22. Thus, it is advantageous to effectively prevent the displacement of the liquid crystal panel 22 toward the rear side.

Therefore, the space formed between the display surface of the liquid crystal panel 22 and the edge part of the opening 1402 of the front panel 1401 can be reliably regulated, which is advantageous to intend an improved appearance. Particularly, even though the liquid crystal panel 22 is upsized and the space tends to widen, the space can be reliably regulated, which is advantageous to intend an improved appearance In addition, the second embodiment also exerts the following advantage.

The front panel 1401 is formed of a synthetic resin material, and the liquid crystal panel 22 is formed of two glass base materials. Therefore, suppose that the thermal expansion coefficient of the front panel 1401 has a value grater than the thermal expansion coefficient of the glass base material and the leg part 70A of the hook 70 is almost abutted against the edge defining the outer region of the liquid crystal panel 22 with almost no space S2 in the assembly of the device.

In this case, when the ambient temperature around the television set 10 greatly drops from the ambient temperature in the assembly of the device, the front panel 1401 is greatly contracted to press the leg part 70A of the hook 70 against the edge defining the outer region of the liquid crystal panel 22, and a large load is applied to the leg part 70A, which is disadvantageous to intend an improved durability of the hook 70.

In contrast to this, the provision of the space S2 as in the embodiment causes merely a small load even though the ambient temperature is changed to press the leg part 70A of the hook 70 against the edge defining the outer region of the liquid crystal panel 22, which is advantageous to intend an improved durability of the hook 70.

In addition, in the embodiment, since the leg part 70A is elastically deformable, the leg part 70A is elastically deformed to sufficiently absorb the load, which is more advantageous to intend an improved durability of the hook 70.

In addition, also in the case in which vibrations or an impact is applied to the cabinet 12, the leg part 70A of the hook 70 is pressed against the edge defining the outer region of the liquid crystal panel 22 to apply a load to the leg part 70A. According to the embodiment, effects as similar to the discussion above can of course reduce the load applied to the leg part 70A.

In addition, in the second embodiment, such an event can be prevented that the leg part 70A of the hook 70 is abutted against the edge defining the outer region of the liquid crystal panel 22 to greatly displace the liquid crystal panel 22 in the direction along the display surface. Therefore, it is advantageous to suppress the relative displacement between the opening 1402 of the front panel 1401 and the display surface of the liquid crystal panel 22 at the minimum.

In addition, it is sufficient that the hook 70 is provided on the front panel 1401, which may be formed in one piece or formed separately. The hook 70 is provided in one piece with the front panel 1401 as in the embodiment, which is advantageous to intend a reduction in the number of parts to curtail costs.

In addition, in the embodiment, the case is described in which a plurality of the hooks 70 is arranged at four positions corresponding to four sides of the liquid crystal panel 22. However, the hooks 70 may be arranged at a single position corresponding to each side of the liquid crystal panel 22.

In addition, in the embodiment, the case is described in which the hook 70 is configured of two leg parts 70A, the connecting part 70C, and the claw 70B. However, the hook 70 may be configured of a single leg part 70A and a single claw 70B, or the hook 70 may be configured of three leg parts 70A and a single claw 70B. The hook 70 may be configured freely.

In addition, in the first and second embodiments, the case is described in which the liquid crystal display device 20 is adapted to the television set. An embodiment of the invention can be of course used for a monitor device of a desktop personal computer, a notebook personal computer, an imaging device such as a video camera and a digital still camera having a liquid crystal display device, a PDA, and a cellular telephone, which can be widely used for various electronic appliances having a liquid crystal display device.

It should be understood by those skilled in the art that various modifications, combinations, sub-combinations and alterations may occur depending on design requirements and other factors insofar as they are within the scope of the appended claims or the equivalents thereof.

The invention claimed is:

1. A liquid crystal display device comprising:
   a cabinet having a front panel facing the front and in which an opening is formed;
   a liquid crystal panel having a display surface; and
   a chassis configured to clamp the outer region of the liquid crystal panel from the front side and the back side, to face the display surface to the opening, and to arrange the liquid crystal panel inside the cabinet,
   wherein a hook is provided that is projected rearward from a position close to the opening on the back surface of the front panel and engaged with the chassis that clamps the outer region of the liquid crystal panel, and prevents a displacement of the chassis toward the rear side,
   wherein the chassis has a front clamping piece facing the outer region of the display surface of the liquid crystal panel and a back clamping piece facing the outer region of the back surface of the liquid crystal panel,
   the outer region of the liquid crystal panel is clamped between the front clamping piece and the back clamping piece; and
   the hook is engaged with the front clamping piece to prevent a displacement of the front clamping piece toward rear side.

2. A liquid crystal display device comprising:
   a cabinet having a front panel facing the front and in which an opening is formed;
   a liquid crystal panel having a display surface; and
   a chassis configured to clamp the outer region of the liquid crystal panel from the front side and the back side, to face the display surface to the opening, and to arrange the liquid crystal panel inside the cabinet,
   wherein a hook is provided that is projected rearward from a position close to the opening on the back surface of the front panel and engaged with the chassis that clamps the outer region of the liquid crystal panel, and prevents a displacement of the chassis toward the rear side,
   wherein the chassis has a front clamping piece facing the outer region of the display surface of the liquid crystal panel and a back clamping piece facing the outer region of the back surface of the liquid crystal panel,
   the outer region of the liquid crystal panel is clamped between the front clamping piece and the back clamping piece,
   a notch is formed on the front clamping piece at a position close to the liquid crystal panel, and
   the hook is engaged with an edge defining the outer region of the notch at a position close to the liquid crystal panel.

3. A liquid crystal display device comprising:
   a cabinet having a front panel facing the front and in which an opening is formed;
   a liquid crystal panel having a display surface; and
   a chassis configured to clamp the outer region of the liquid crystal panel from the front side and the back side, to face the display surface to the opening, and to arrange the liquid crystal panel inside the cabinet,
   wherein a hook is provided that is projected rearward from a position close to the opening on the back surface of the front panel and engaged with the chassis that clamps the outer region of the liquid crystal panel, and prevents a displacement of the chassis toward the rear side,
   wherein the hook has a leg part projected rearward from the back surface of the front panel and a claw projected from the rear end of the leg part in a direction intersecting with the projecting direction of the leg part,
   the leg part is formed elastically deformable in a direction intersecting with the projecting direction,
   the chassis has a front clamping piece facing the outer region of the display surface of the liquid crystal panel and a back clamping piece facing the outer region of the back surface of the liquid crystal panel,
   the outer region of the liquid crystal panel is clamped between the front clamping piece and the back clamping piece,
   the front clamping piece has a front surface facing a front panel and a back surface facing a display surface of the liquid crystal panel,
   a notch is formed on the front clamping piece at a position close to the liquid crystal panel, and
   the hook is engaged at a position close to the liquid crystal panel at which the leg part passes through the notch and the claw is engaged at an edge defining the outer region of the notch on the back surface of the front clamping piece.

4. A liquid crystal display device comprising:
   a cabinet having a front panel facing the front and in which an opening is formed;
   a liquid crystal panel having a display surface; and
   a chassis configured to clamp the outer region of the liquid crystal panel from the front side and the back side, to face the display surface to the opening, and to arrange the liquid crystal panel inside the cabinet,
   wherein a hook is provided that is projected rearward from a position close to the opening on the back surface of the front panel and engaged with the chassis that clamps the outer region of the liquid crystal panel, and prevents a displacement of the chassis toward the rear side,
   wherein the hook has a leg part projected rearward from the back surface of the front panel and a claw projected from the rear end of the leg part in a direction intersecting with the projecting direction of the leg part,
   the leg part is formed elastically deformable in a direction intersecting with the projecting direction,
   the chassis has a front clamping piece facing the outer region of the display surface of the liquid crystal panel and a back clamping piece facing the outer region of the back surface of the liquid crystal panel,
   the outer region of the liquid crystal panel is clamped between the front clamping piece and the back clamping piece,
   the front clamping piece has a front surface facing a front panel and a back surface facing a display surface of the liquid crystal panel,
   a notch is formed on the front clamping piece at a position close to the liquid crystal panel,
   the hook is engaged at a position close to the liquid crystal panel at which the leg part passes through the notch and the claw is engaged at an edge defining the outer region of the notch on the back surface of the front clamping piece,
   the front panel is formed of a synthetic resin, and the hook is formed in one piece with the front panel,
   the liquid crystal display device is configured to include a back light unit arranged on the rear side of the liquid crystal panel,
   the chassis has a bottom chassis and a middle chassis holding the back light unit and a top chassis formed of a metal that is joined to these chassis,
   the front clamping piece is provided on the top chassis, and a space is provided between an edge defining the outer region of the notch of the front clamping piece with which the claw is engaged and the leg part.

5. A liquid crystal display device comprising:

a cabinet having a front panel facing the front and in which an opening is formed;

a liquid crystal panel having a display surface; and a chassis configured to clamp the outer region of the liquid crystal panel from the front side and the back side, to face the display surface to the opening, and to arrange the liquid crystal panel inside the cabinet, wherein a hook is provided that is projected rearward from a position close to the opening on the back surface of the front panel and engaged with the chassis that clamps the outer region of the liquid crystal panel, and prevents a displacement of the chassis toward the rear side, wherein the chassis has a front clamping piece facing the outer region of the display surface of the liquid crystal panel and a back clamping piece facing the outer region of the back surface of the liquid crystal panel, the outer region of the liquid crystal panel is clamped between the front clamping piece and the back clamping piece, the front clamping piece has a front surface facing a front panel and a back surface facing a display surface of the liquid crystal panel, a recessed part is provided that is recessed rearward in the front clamping piece from a position close to the liquid crystal panel, a notch is formed on the bottom part of the recessed part, the hook has a leg part projected rearward from the back surface of the front panel and a claw projected from the rear end of the leg part in a direction intersecting with the projecting direction of the leg part, the hook is engaged at a position close to the liquid crystal panel at which the leg part passes through the notch and the claw is engaged at an edge defining the outer region of the notch on the back surface of the front clamping piece, the front panel is formed of a synthetic resin, and the hook is formed in one piece with the front panel, the liquid crystal display device is configured to include a back light unit arranged on the rear side of the liquid crystal panel, the chassis has a bottom chassis and a middle chassis holding the back light unit and a top chassis formed of a metal that is joined to these chassis, the front clamping piece is provided on the top chassis, and the leg part is formed elastically deformable in a direction intersecting with the projecting direction.

6. A liquid crystal display device comprising:

a cabinet having a front panel facing the front and in which an opening is formed;

a liquid crystal panel having a display surface; and a chassis configured to clamp the outer region of the liquid crystal panel from the front side and the back side, to face the display surface to the opening, and to arrange the liquid crystal panel inside the cabinet, wherein a hook is provided that is projected rearward from a position close to the opening on the back surface of the front panel and engaged with the back surface of the liquid crystal panel, and prevents a displacement of the chassis toward the rear side.

7. The liquid crystal display device according to claim 6, wherein a notch is provided at a position close to the opening of the chassis, and the hook passes through the notch, and is projected rearward to engage with the back surface of the liquid crystal panel.

8. The liquid crystal display device according to claim 6, wherein the hook has a leg part projected rearward from the back surface of the front panel and a claw projected from the rear end of the leg part in a direction of intersecting the projecting direction of the leg part and engaged with the back surface of the liquid crystal panel, the leg part is formed elastically deformable in a direction intersecting with the projecting direction, and a space is provided between the liquid crystal panel and the leg part.

9. The liquid crystal display device according to claim 7, wherein the chassis has a front clamping piece facing the outer region of the display surface of the liquid crystal panel and a back clamping piece facing the outer region of the back surface of the liquid crystal panel, the outer region of the liquid crystal panel is clamped between the front clamping piece and the back clamping piece, and the notch is formed on the front clamping piece and the back clamping piece.

10. The liquid crystal display device according to claim 7, wherein the liquid crystal display device is configured to include a back light unit arranged on the rear side of the liquid crystal panel, the chassis has a bottom chassis and a middle chassis holding the back light unit, and a top chassis joined to the chassis, the chassis has a front clamping piece facing the outer region of the display surface of the liquid crystal panel and a back clamping piece facing the outer region of the back surface of the liquid crystal panel, the outer region of the liquid crystal panel is clamped between the front clamping piece and the back clamping piece, the front clamping piece is provided on the top chassis, and the back clamping piece is provided on the middle chassis, and the notch is formed on the front clamping piece and the back clamping piece.

11. The liquid crystal display device according to claim 7, wherein the chassis has a front clamping piece facing the outer region of the display surface of the liquid crystal panel and a back clamping piece facing the outer region of the back surface of the liquid crystal panel, the outer region of the liquid crystal panel is clamped between the front clamping piece and the back clamping piece in a state in which an elastic body is put between the front clamping piece and the outer region of the display surface of the liquid crystal panel and an elastic body is put between the back clamping piece and the outer region of the back surface of the liquid crystal panel, and the notch is formed on the front clamping piece and on the back clamping piece.

12. The liquid crystal display device according to claim 6, wherein the liquid crystal panel has a rectangular shape, and the hook is provided at four positions corresponding to four sides of the liquid crystal panel.

13. The liquid crystal display device according to claim 6, wherein the liquid crystal panel has a rectangular shape, and a plurality of the hooks is provided and spaced in a direction of extending on each side at positions corresponding to four sides of the liquid crystal panel.

14. A liquid crystal module comprising:

a liquid crystal panel;

a back light unit arranged on the rear side of the liquid crystal panel; and a chassis configured to hold the liquid crystal panel and the back light unit, wherein the chassis has a front clamping piece facing the outer region of the display surface of the liquid crystal panel and a back clamping piece facing the outer region of the back surface of the liquid crystal panel, the liquid crystal panel is held by clamping the outer region of the liquid crystal panel between the front clamping piece and the back clamping piece, the front clamping piece has a front surface facing a front panel and a back surface facing a display surface of the liquid crystal panel, and a notch is formed on the front clamping piece at a position close to the liquid crystal panel, the notch is engaged with a hook from the back surface of the front clamping piece and prevents a displacement of the liquid crystal panel toward rear side.

15. A liquid crystal module comprising:

a liquid crystal panel;

a back light unit arranged on the rear side of the liquid crystal panel; and a chassis configured to hold the liquid crystal panel and the back light unit, wherein the liquid crystal panel is held by clamping the outer region of the liquid crystal panel by means of the chassis, and a notch is formed on the chassis at a position close to the liquid crystal panel, the notch is engaged with a hook with the back surface of the liquid crystal panel from the rear side and prevents a displacement of the liquid crystal panel toward the rear side.

16. A liquid crystal module comprising:

a liquid crystal panel;

a back light unit arranged on the rear side of the liquid crystal panel; and a chassis configured to hold the liquid crystal panel and the back light unit, wherein the chassis has a front clamping piece facing the outer region of the display surface of the liquid crystal panel and a back clamping piece facing the outer region of the back surface of the liquid crystal panel, the liquid crystal panel is held by clamping the outer region of the liquid crystal panel between the front clamping piece and the back clamping piece, and a notch is formed on the front clamping piece and on the back clamping piece at positions close to the liquid crystal panel, the notch allows a hook to be engaged with the back surface of the liquid crystal panel from the rear side and prevents a displacement of the liquid crystal panel toward the rear side.

* * * * *